(12) United States Patent
Bourn

(10) Patent No.: US 8,136,839 B2
(45) Date of Patent: Mar. 20, 2012

(54) APPARATUS FOR COUNTERBALANCING A VEHICLE POSITIONED ON AN INCLINED SURFACE

(76) Inventor: David Bourn, Laurel Springs, NC (US)

( * ) Notice: Subject to any disclaimer, the term of this patent is extended or adjusted under 35 U.S.C. 154(b) by 396 days.

(21) Appl. No.: 12/492,140

(22) Filed: Jun. 26, 2009

(65) Prior Publication Data

US 2010/0327569 A1 Dec. 30, 2010

(51) Int. Cl.
*B60R 21/00* (2006.01)
*B62D 49/08* (2006.01)

(52) U.S. Cl. ..... 280/755; 280/758; 280/759; 280/763.1; 280/764.1; 280/765.1

(58) Field of Classification Search ............... 280/755, 280/758, 759, 6.154, 6.15, 763.1, 764.1, 280/765.1, 766.1

See application file for complete search history.

(56) References Cited

U.S. PATENT DOCUMENTS

| 1,277,434 | A | * | 9/1918 | leadbeater | 280/759 |
| 4,197,806 | A | * | 4/1980 | Laxo | 114/331 |
| 4,817,550 | A | * | 4/1989 | Gutsche | 114/124 |
| 5,615,785 | A | * | 4/1997 | Kaner | 212/180 |
| 7,121,560 | B1 | * | 10/2006 | Balzano | 280/11 |
| 7,309,080 | B2 | * | 12/2007 | Mein | 280/762 |
| 7,681,274 | B2 | * | 3/2010 | Belanger | 15/53.2 |

* cited by examiner

*Primary Examiner* — Paul N Dickson
*Assistant Examiner* — Joselynn Y Sliteris
(74) *Attorney, Agent, or Firm* — Casey S. Parks

(57) ABSTRACT

An apparatus for providing counterweight to a vehicle on an inclined surface. In one embodiment, a control unit may engage a motor, which rotates a weight such that it is positioned to act as a counterweight for a vehicle on an inclined surface. In another embodiment, when an inclinometer detects the vehicle is positioned on an inclined surface, logic circuitry engages motor, causing a weight to rotate to a position such that it acts as a counterweight for the vehicle.

17 Claims, 3 Drawing Sheets

APPARATUS FOR COUNTERBALANCING A VEHICLE POSITIONED ON AN INCLINED SURFACE

BACKGROUND OF THE INVENTION

1. Field of the Invention

Embodiments of the invention generally relate to the field of counterbalancing a vehicle by the use of a counterweight. More specifically, embodiments of the invention relate to a rotatable counterweight that can be repositioned to counterbalance and improve the traction of a vehicle on an inclined surface.

2. Description of the Related Art

The traction of a vehicle may be increased by adding weight to the vehicle. For some vehicles with large, heavily-treaded rear wheels, such as tractors, this weight is most efficiently added to the rear of the vehicle. For example, one method of adding weight to a tractor, and thus improving the traction, is filling the rear tires with a Calcium Chloride solution. One advantage to this technique is that by storing the solution inside the inner tube, the solution will rest on the bottom of the inner tube. Thus, the added weight is positioned as low as possible on the tractor, which is beneficial for both tractor traction and tractor safety. However, dealing with the Calcium Chloride solution can be dangerous to the average tractor operator, and the increased weight of the tires can make them incredibly difficult to remove or to lift.

A second method of adding weight to a tractor or another vehicle is through the use of cast-iron wheel weights. These weights, which may be a single piece or multiple pieces, are mounted to one or both sides of the wheel rim. While these weights increase the vehicle's traction, they can often be difficult to lift and to mount and unmount from the wheel rims.

Adding large amounts of weight to the rear of a vehicle is not without risk. The most serious disadvantage to this technique is increased risk that the vehicle will flip over backwards. While the vehicle may have increased traction, it will also have an increased risk of flipping backwards, a very serious risk for both the vehicle and its operator. Additionally, some parts on the vehicle may experience increased wear and tear due to the extra added weight. Thus, while there are methods of increasing a vehicle's traction, they are not without their downsides and risks.

SUMMARY OF THE INVENTION

The present disclosure generally relates to an apparatus for counterbalancing a vehicle positioned on an inclined surface. In one embodiment, the apparatus includes a rotatable assembly mounted onto a vehicle, comprising a geared rotatable disc and an extended arm, configured in such a way that when the geared rotatable disc rotates, the extended arm rotates as well. Additionally, a weight may be attached to the extended arm. The weight acts to provide a counterweight for the vehicle when the vehicle is positioned on an inclined surface. In one embodiment, a motor may be connected to the geared rotatable disc which facilitates rotating the geared rotatable disc. This motor may be powered via a power source connected to the motor. Additionally, a control mechanism may be connected to the motor. This control mechanism, when engaged, activates the motor, causing the rotatable geared disc to rotate the extended arm and thus the weight as well, whereby the weight may be positioned in the optimal position for acting as a counterweight for the vehicle.

In another embodiment, the apparatus comprises a geared rotatable disc and an extended arm, connected such that when the geared rotatable disc rotates, then the extended armor rotates as well. Furthermore, a weight may be attached to the extended arm, for providing counterweight for a vehicle. Additionally, a motor may be connected to the geared rotatable disc, whereby when the motor is activated, the geared rotatable disc rotates, thus rotating the extended arm and weight as well. A power source may be connected to the motor for providing power to the motor. Logic circuitry may also be connected to the motor, wherein the logic circuitry may engage the motor when certain conditions are satisfied. In one embodiment, an inclinometer may be connected to the logic circuitry. When the inclinometer detects that the vehicle is positioned on an inclined surface, the logic circuitry may activate the motor, causing the extended arm and the weight to rotate until the weight is in the optimal position to act as a counterweight for the vehicle.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention generally comprise a system for providing counterweight to a vehicle on an inclined surface. This system may be attached to the rear of a vehicle and generally features a rotatable counterweight that may be positioned to rest on either side of the vehicle. This may be used to help prevent the vehicle from tipping over when operating on an inclined surface. For example, with the present invention mounted to a tractor operating on an inclined surface, the counterweight may be positioned to rest on the higher side of the tractor. That is, the weight may be positioned uphill, thus providing extra weight opposite the side that the tractor is likely to roll.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
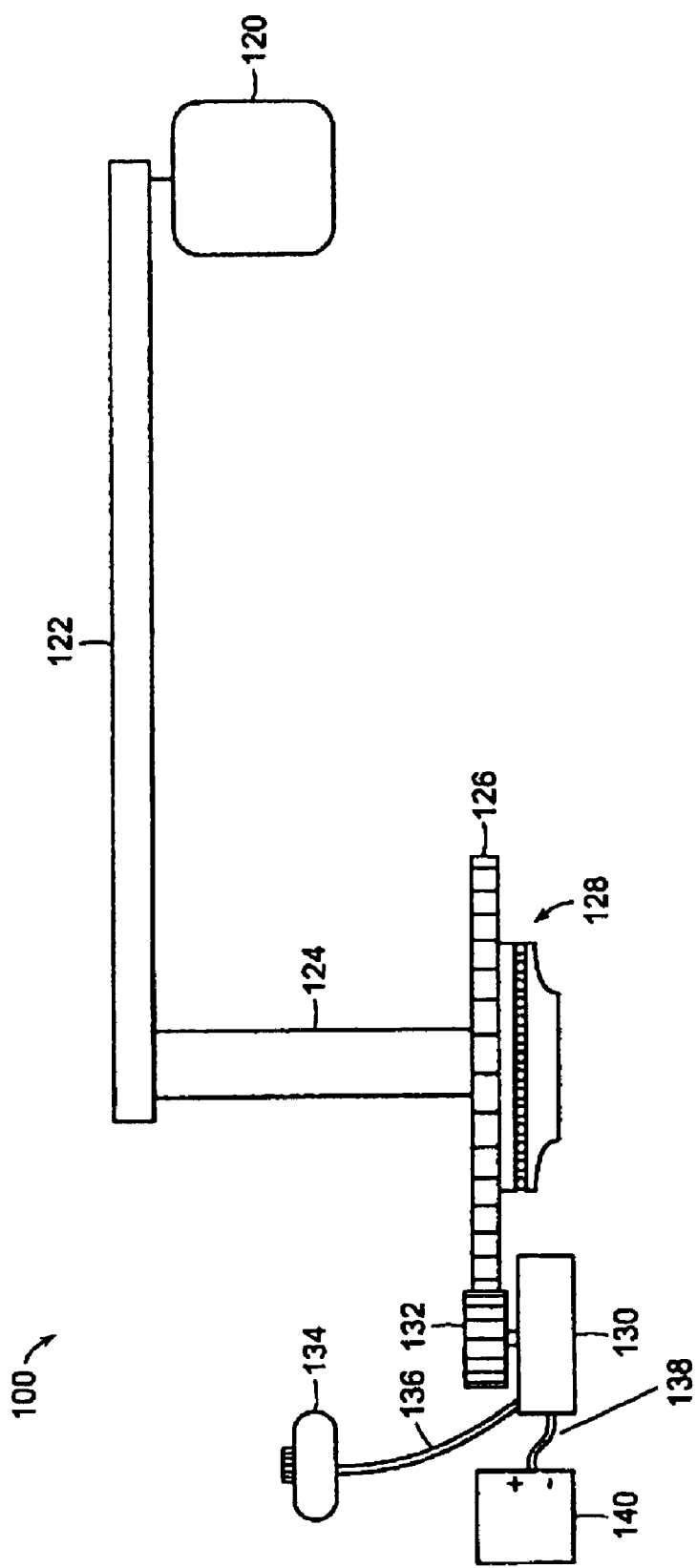
FIG. 1 illustrates an example system for providing counterweight to a vehicle on an inclined surface, according to one embodiment of the invention.

FIG. 1 illustrates an example system 100 for providing counterweight to a vehicle on an inclined surface, according to one embodiment of the invention. In general, the system 100 includes a counterweight 120 attached to a horizontal arm 122, with the horizontal arm 122 attached to a vertical beam 124. The mass of counterweight 120 may vary depending on the implementation, but generally should be of sufficient mass to provide an effective counterweight for the vehicle it is attached to. In general, the mass of the counterweight 120 should be proportional to the system 100 it is being used with. For example, a large piece of machinery, such as a farm tractor, may require a heavier counterweight 120 than a small, personal tractor.

The horizontal arm 122 acts to extend the counterweight 120 away from the rest of the system 100. This allows the weight of counterweight 120 to be applied from various sides of the system 100. For instance, as shown, the counterweight's 120 mass is applied on the right side of the system 100. This is beneficial, as, for example, it allows the counterweight 120 to be adjusted depending on the incline of the surface the vehicle is operating on. That is, the counterweight 120 may be positioned on the upside of a hill, thus increasing the vehicle's traction and reducing its likelihood of tipping over. By applying the weight of the counterweight 120 entirely on one side of the vehicle, the system 100 operates more efficiently than other counterweights such as wheel weights or using a Calcium Chloride solution, and thus requires less weight added to the vehicle. This is advantageous, as it reduces the likelihood of the vehicle flipping backwards, as well as the wear and tear on the vehicle's parts.

The material and shape of the horizontal arm 122 may vary depending on implementation, but in any case should be of sufficient strength to support the counterweight 120. Thus, stronger materials, such as iron or steel, may be required for the horizontal arm 122 when used with a heavier counterweight 120.

The vertical beam 124 acts to elevate the horizontal arm 122 and counterweight 120 from the rest of the system 100. The height of the vertical beam 124 may vary depending on implementation. For example, a system 100 used with a farm tractor may require a taller vertical beam in order to elevate the horizontal arm 122 over the large rear tires of the tractor. However, a system for use with a personal tractor may only require a shorter vertical beam 124 in order to elevate the horizontal arm 122 over the sides of the tractor. The size and shape of the vertical beam 124 should be of sufficient strength to support the weight of the horizontal arm 122 and the counterweight 120. The vertical beam 124 may be constructed from any material that is sufficiently strong to support the weight of the horizontal arm 122 and the counterweight 120, with materials such as iron and steel being preferred.

In one embodiment, the vertical beam 124 attaches to a geared disc 126. In such a configuration, when the geared disc 126 rotates, the vertical beam 124, and thus the horizontal arm 122 and counterweight 120, rotate as well. Such an arrangement allows the counterweight 120 to be repositioned and thus act as an effective counterweight for a vehicle operation on various inclined surfaces. For example, when the vehicle is operating on an inclined surface, the counterweight 120 is rotated such that it is positioned uphill from the vehicle, thus acting as an effective counterweight and increasing the vehicle's traction and stability.

In one embodiment, the geared disc 126 is supported by a ball bearing 128. The ball bearing 128 allows the geared disc 126 to rotate smoothly while under the weight of the vertical shaft 124, horizontal arm 122 and counterweight 120. The size and strength of the ball bearing 128 should be proportional to the weight of the counterweight 120, vertical beam 124 and horizontal arm 122. Thus, for a larger counterweight 120, such as would be used on a large farm tractor, a strong ball bearing is required in order to ensure smooth rotation and sufficient support for the geared disc 126.

In one embodiment, a motor 130 is placed adjacent to the geared disc 126 and ball bearing 128 arrangement. Here, the motor 130 turns the motor's geared disc 132. The teeth of geared disc 132 mesh with the teeth of geared disc 126, such that when the motor 130 is activated and rotates geared disc 132, this in turn causes geared disc 126 to rotate as well. As such, while different numbers of teeth may be used per gear depending on implementation, it is important that geared disc 126 and geared disc 132 mesh together.

The motor 130 may be bidirectional, such that is it capable of rotating the geared disc 132 in both clockwise and counterclockwise rotations. Such an arrangement allows the counterweight 120 to be rotated to opposite sides of the vehicle depending on the incline of the surface. For example, for a system 100 mounted on the rear of a tractor, a bidirectional motor 130 allows the counterweight 120 to be shifted both from left-to-right and from right-to-left of the tractor without having to pass over the front-side of the tractor. This is beneficial, as it allows the counterweight to be rotated both directions while avoiding the front-side of the tractor and the operator.

Additionally, stops may be placed on the geared disc 132 that prevent it from rotating more than 180 degrees. For instance, the stops may consist of a metal plate on each side of the geared disc 132 that prevent the disc from rotating any further. By limiting the rotation to 180 degrees, this ensures that the counterweight 120 does not pass over the front-side of the vehicle when rotating. This is advantageous when the vehicle's operator or tall parts of the vehicle are positioned on the front-side of the vehicle.

The size and strength of the motor 130 may vary depending on implementation, but should be sufficient to effectively rotate the geared disc 126 under the weight of the horizontal arm 122, vertical shaft 124 and counterweight 120. Thus, a stronger motor 130 may be required for a larger vehicle making use of a heavier counterweight 120.

In one embodiment, a controller 134 is connected to the motor 130 via connector 136. This controller 134 may be used by the vehicle's operator to engage the motor 130 and to shift the counterweight 120 from side to side. For example, when operating the vehicle on an inclined surface where the right side of the vehicle is on the upside of the hill, the vehicle operator may utilize the controller 134 to shift the counterweight 120 to the right side of the vehicle. By doing so, the weight of the counterweight 120 is applied on the side opposite the downside of the hill and acts as an effective counterweight for the vehicle, thus making the vehicle less likely to roll down the hill. The connector 136 may consist of one or more wires or other mechanism that effectively connects the controller 134 to the motor 130.

A battery 140 may be connected to and power the motor 130 via a connector 138. For a system 100 attached to a vehicle, the battery 140 may be that vehicle's battery. The system 100 may also operate from a battery 140 separate from the vehicle's battery. The battery 140 should be of sufficient power to support the motor 130. For example, a heavier vehicle may require a heavier counterweight 120 in order for the system 100 to be effective, and thus a stronger motor 130 and stronger battery 140 may also be required.

Figure 2:
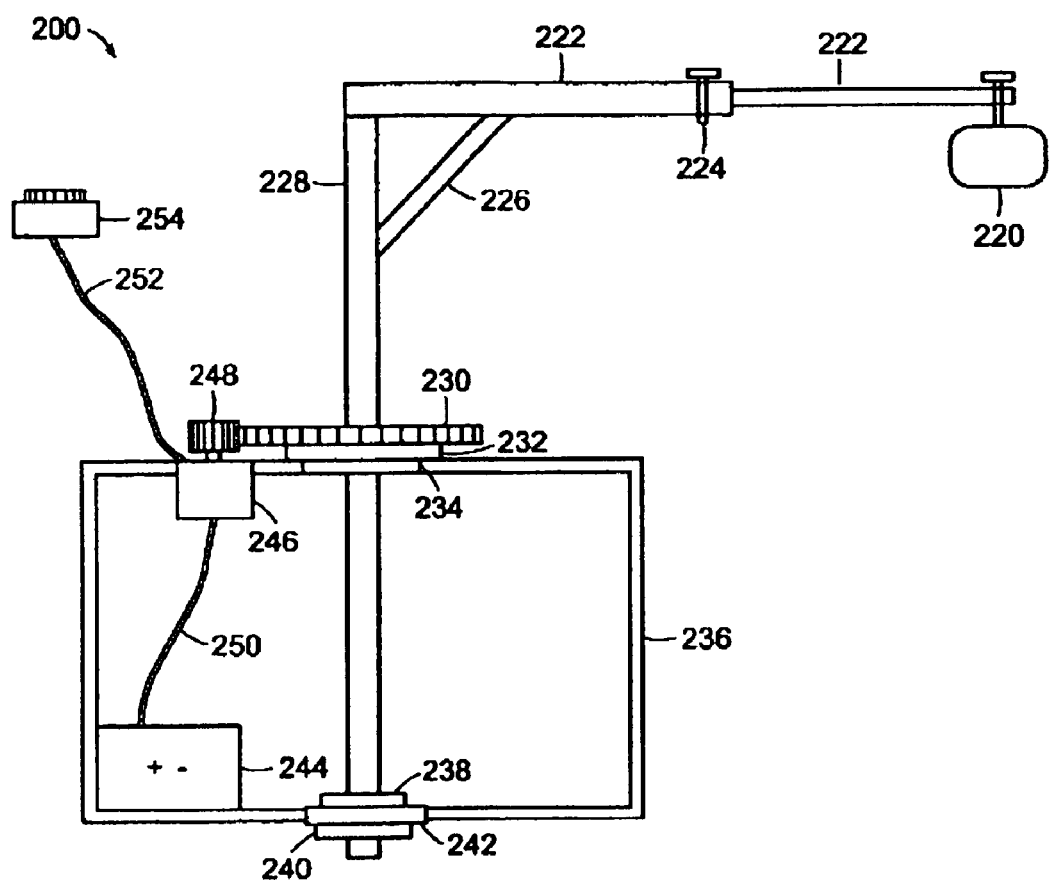
FIG. 2 illustrates an example system for providing counterweight to a vehicle on an inclined surface, according to one embodiment of the invention.

FIG. 2 illustrates an example system 200 for providing counterweight to a vehicle on an inclined surface, according to one embodiment of the invention. In this embodiment, a counterweight 220 is attached to an extendable horizontal arm 222. The size and mass of the counterweight 220 may vary depending on the embodiment and the vehicle the system 200 is mounted to. The extendable horizontal arm 222 in this embodiment may be locked in place by a locking mechanism 224. This may be beneficial in situations where the counterweight 220 must remain close to the vehicle, such as when the vehicle needs to maneuver through a narrow path. Alternatively, the extendable horizontal arm 222 may be lengthened, which may be beneficial in situations such as use on a farm tractor, where the arm may need to extend out past the large rear tires.

In one embodiment, the extendable horizontal arm 222 is attached to a vertical beam 228. The vertical beam 228 may be cylindrical or rectangular in shape. Additionally, the vertical beam 228 may be constructed of a material capable of supporting the weight of the counterweight 220. For example, materials such as steel, iron or similar materials may be used for the construction of the vertical beam 228. The extendable horizontal arm 222 may also be supported by a support brace 226. The support brace 226 works to improve the structural integrity of the horizontal arm 222 and assists in supporting the weight of the counterweight 220.

In one embodiment, a rotatable geared disc 230 may be attached to the locating collar 232. The locating collar 232 may be used to attach the rotatable geared disc 230 to a midsection of the vertical beam 228. The locating collar 232 may rest atop of a thrust ball bearing 234. The thrust ball bearing 234 helps to support the vertical shaft 228 and the rotatable geared disc 230 and allows them to rotate freely under the weight of the counterweight 220. For instance, the rotatable geared disc 230 could be an automotive flywheel.

In this embodiment, a second thrust ball bearing 242 is used to provide additional support to the vertical beam 228. The thrust ball bearing 234 and thrust ball bearing 242 relieve the weight from the rotatable geared disc 230, while still allowing the rotatable geared disc 230 to rotate smoothly. The thrust bearing 242 is attached to the vertical shaft by use of a locating collar 238 and a locking collar 240, which work to secure the thrust bearing 242 to the vertical shaft 228.

As shown in FIG. 2, thrust bearing 234 and thrust bearing 242 may be attached to a frame 236. The frame 236 provides a container for various parts of the system 200. Additionally, the frame 236 provides an anchoring point for attaching the system 200 to a vehicle. For example, the system 200 may be affixed to a vehicle, such as a tractor, by attaching the frame 236 to the structure of the tractor. For vehicles that place an emphasis on the rear wheels for traction and stability, such as farm tractors with their large rear wheels, the frame 236 should be mounted to the rear of the vehicle to ensure optimal performance. The frame 236 may be attached via welding, bolting, or other suitable means. Additionally, since the frame 236 is the only piece that attaches to the vehicle, it is easier to mount and unmount to a vehicle than, for instance, multi-part wheel weights.

The system 200 may also contain a battery 244, which may be attached via a connector 250 to a motor 246. The battery 244 works to provide power to the motor 246, and may be the vehicle's battery or an independent battery. As an example, the battery of a tractor may be wired to the motor 246 in order to provide power.

The motor 246, when activated, rotates a geared disc 248, which is meshed together with the rotatable geared disc 230. Thus, when the motor 246 is engaged, it rotates the geared disc 248, which rotates the geared disc 230, which in turn rotates the extendable horizontal arm 222 and the affixed counterweight 220. The motor 246 may be bidirectional, so that it can rotate both counterclockwise and clockwise, which provides additional flexibility in utilizing the system 200.

In one embodiment, the motor 246 may be controlled via a controller 254, which is connected to the motor 246 via a connector 252. The connector 252 may consist of one or more wires which relay the signal from the controller 254 to the motor 246. If a bidirectional motor is used, the controller 254 should be capable of signaling the motor 246 to turn in either direction.

The controller 254 may be attached in a different location on the vehicle than the rest of the system 200. For example, when the system is mounted onto a tractor, the frame 236 and the rest of the components may be affixed to the rear of the tractor to provide increased traction for the tractor's rear wheels. However, since the controller 254 requires a user interaction, it may be mounted near the operator's seat on the tractor.

Figure 3:
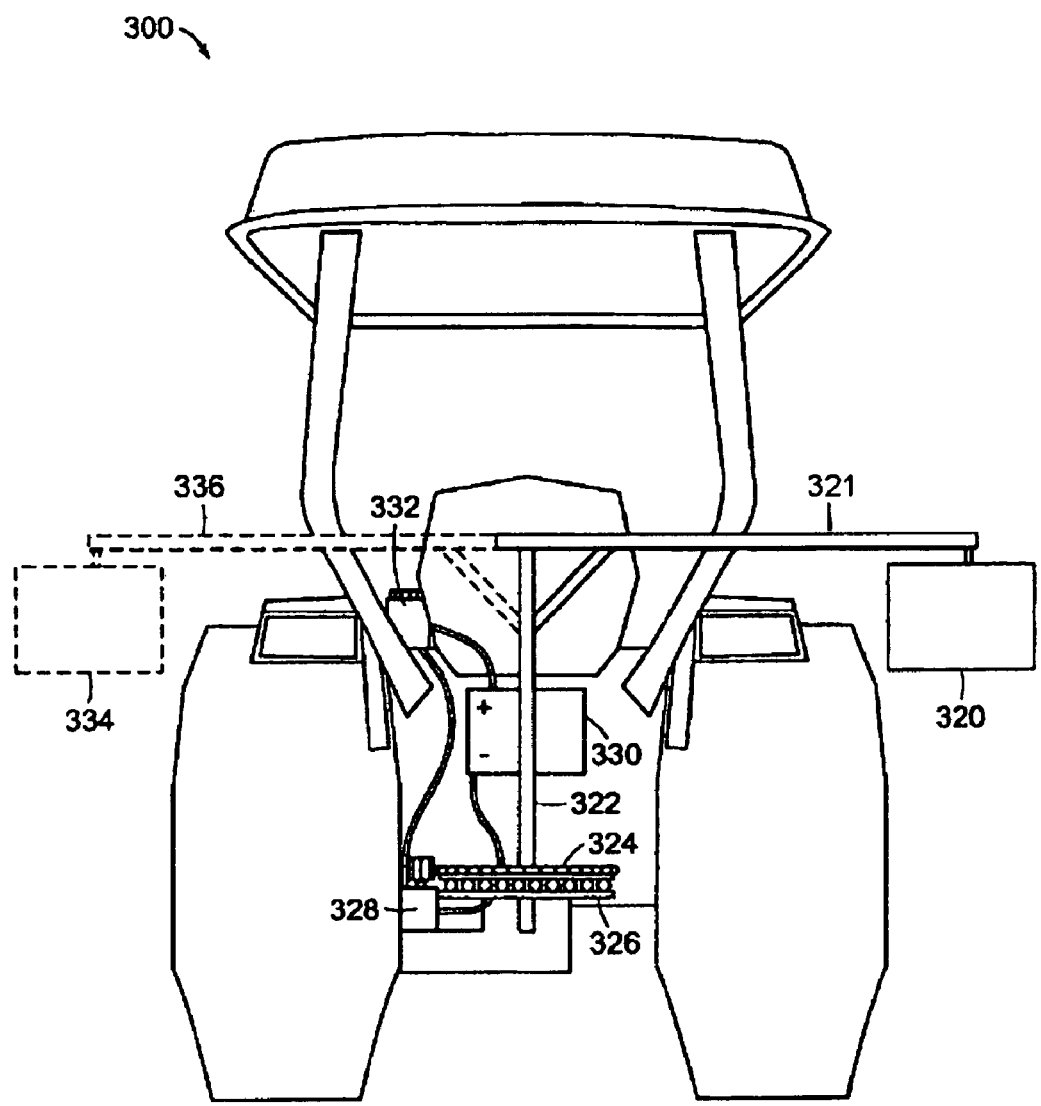
FIG. 3 illustrates an example system for providing counterweight to a tractor on an inclined surface, according to one embodiment of the invention.

FIG. 3 illustrates an example system for providing counterweight to a tractor on an inclined surface, according to one embodiment of the invention. In this embodiment, a counterweight 320 is extended from a horizontal arm 321, which is in turn attached to a vertical beam 322. As in FIG. 1, the vertical beam 322 here is attached to a rotatable geared disc 324, which is supported by a ball bearing 326. In this embodiment, the rotatable disc 324 is rotated by a bidirectional motor 328. The tractor's battery 330 provides power to the motor 328. A controller 332, positioned near the tractor operator's seat, allows the operator to engage the bidirectional motor 328 and rotate the counterweight 320.

In this embodiment, when operating the tractor on a hill where, when viewed from the rear of the tractor, the upside of the hill is on the right side of the tractor and the downside of the hill is on the left side of the tractor, the optimal position for the counterweight 320 is on the right side of the tractor as shown in FIG. 3. However, if operating on an inclined surface where the upside of the hill is on the left side of the tractor, the tractor operator may use the controller 332 to engage the motor 328 and rotate the horizontal beam 321 and counterweight 320 to the alternate horizontal beam 336 and alternate counterweight position 334. Thus, depending on the incline of the surface, the operator may shift the position of the counterweight 320 to provide the optimal traction for the tractor and reduced risk of the tractor tipping over.

By rotating the counterweight 320 in this way, the operator may position the counterweight 320 in the optimal position. This allows the system to maintain optimal traction for the vehicle, and because the counterweight 320 can always be positioned in the optimal position, less weight is required to maintain the tractor's traction under other systems, such as wheel weights. This is advantageous, as it reduces the downsides of known tractor counterweights such as wheel weights or use of a Calcium Chloride solution. That is, by requiring less weight added to the vehicle, it reduces the risk of the vehicle flipping backwards, as well as reducing the strain on the vehicle's parts from the added weight.

In an alternate embodiment, the controller 332 may consist of a computer or logic circuitry that operates automatically, as opposed to being manually controlled by the vehicle operator. In such an embodiment, the controller 332 may include an inclinometer that allows it to detect when the vehicle is operating on an inclined surface. In such a scenario, the controller 332 may automatically engage the motor when the inclinometer detects that the vehicle is positioned on an inclined surface, thus rotating the counterweight 320 to the optimal position for the inclined surface, as noted above.

While the foregoing is directed to embodiments of the present invention, other and further embodiments of the invention may be devised without departing from the basic scope thereof, and the scope thereof is determined by the claims that follow.

What is claimed is:

1. An apparatus for counterbalancing a vehicle positioned on an inclined surface comprising:
 a rotatable assembly having a geared rotatable disc and an extended arm, such that when the geared rotatable disc rotates, the extended arm rotates as well;
 a weight attached to the extended arm for providing counterweight for the vehicle;
 a motor having a geared motor disc, the geared motor disc being meshed with the geared rotatable disc, whereby when the motor is activated, the geared motor disc rotates, thus rotating the geared rotatable disc as well;
 a power source connected to the motor for providing power to the motor; and
 a control mechanism connected to the motor, such that when the control mechanism is engaged, the control mechanism activates the motor which rotates the geared motor disc, causing the geared rotatable disc to rotate, which in turn causes the extended arm and the weight to rotate as well,
 whereby the control mechanism is used to rotate the weight such that the weight is optimally positioned to act as a counterweight for the vehicle positioned on an inclined surface.

2. The apparatus of claim 1, further comprising a support brace connected to the extended arm for providing structural support.

3. The apparatus of claim 1, wherein the motor is a bidirectional motor.

4. The apparatus of claim 1, wherein the power source is a battery of the vehicle.

5. The apparatus of claim 1, wherein the rotatable geared disc is an automotive flywheel.

6. The apparatus of claim 1, wherein the extended arm is extendable, such that the length of the extended arm may be adjusted.

7. The apparatus of claim 1, further comprising a frame connected to the motor and the rotatable assembly, wherein the frame is mountable upon the vehicle in order to attach the apparatus to the vehicle.

8. The apparatus of claim 1, further comprising one or more ball bearings attached to the rotatable geared disc for providing support to the rotatable geared disc and facilitating the rotation of the rotatable geared disc when the rotatable geared disc is bearing weight.

9. The apparatus of claim 7, wherein the frame is mounted upon a rear portion of the vehicle.

10. The apparatus of claim 1, wherein the geared rotatable disc is coupled to the extended arm using a vertical beam, wherein the vertical beam is positioned perpendicularly relative to the extended arm, and wherein the height of the vertical beam is based upon one or more characteristics of the vehicle.

11. The apparatus of claim 10, wherein the vertical beam is constructed using at least one of iron or steel.

12. An apparatus for counterbalancing a tractor positioned on an inclined surface comprising:
 a rotatable assembly having a geared rotatable disc, a vertical beam and an extended arm, wherein both the geared rotatable disc and the extended arm are coupled to the vertical beam such that when the geared rotatable disc rotates, the extended arm rotates as well, wherein the vertical beam is oriented perpendicularly relative to the extended arm, and wherein the height of the vertical beam is based upon one or more characteristics of the tractor;
 a weight attached to the extended arm for providing counterweight for the tractor;
 a bidirectional motor having a geared motor disc, the geared motor disc being meshed with the geared rotatable disc, whereby when the motor is activated, the geared motor disc rotates, thus rotating the geared rotatable disc as well;
 a power source connected to the motor for providing power to the motor, wherein the power source is a battery of the tractor; and
 a control mechanism connected to the motor, such that when the control mechanism is engaged, the control mechanism activates the motor which rotates the geared motor disc, causing the geared rotatable disc to rotate, which in turn causes the extended arm and the weight to rotate as well, wherein the control mechanism is manually engagable by a user of the tractor,
 whereby the control mechanism is used to rotate the weight such that the weight is optimally positioned to act as a counterweight for the tractor positioned on an inclined surface.

13. The apparatus of claim 12, wherein the extended arm is extendable, such that the length of the extended arm may be adjusted.

14. The apparatus of claim 12, further comprising a support brace connected to the extended arm for providing structural support.

15. The apparatus of claim 12, further comprising:
 a frame coupled to both the bidirectional motor and the rotatable assembly, wherein the frame is mountable upon a rear portion of the tractor in order to attach the apparatus to the tractor.

16. The apparatus of claim 12, wherein the geared rotatable disc is coupled to the vertical beam using a locating collar, wherein the locating collar is oriented above a thrust ball bearing which provides support for the vertical beam and the geared rotatable disc, and wherein a second thrust ball bearing is secured to the vertical beam using both a second locating collar and a locking collar.

17. An apparatus for counterbalancing a tractor positioned on an inclined surface comprising:
 a rotatable assembly having a geared rotatable disc, a vertical beam and an extended arm, wherein both the geared rotatable disc and the extended arm are coupled to the vertical beam such that when the geared rotatable disc rotates, the extended arm rotates as well, wherein the vertical beam is oriented perpendicularly relative to the extended arm, wherein the geared rotatable disc is coupled to the vertical beam using a locating collar, wherein the locating collar is oriented above a thrust ball bearing which provides support for the vertical beam and the geared rotatable disc, and wherein a second thrust ball bearing is secured to the vertical beam using both a second locating collar and a locking collar;
 a weight attached to the extended arm for providing counterweight for the tractor;

a support brace coupled to the extended arm and the vertical beam for providing structural support for the extended arm;

a bidirectional motor having a geared motor disc, the geared motor disc being meshed with the geared rotatable disc, whereby when the motor is activated, the geared motor disc rotates, thus rotating the geared rotatable disc as well;

a frame coupled to both the bidirectional motor and the rotatable assembly, wherein the frame is mountable upon a rear portion of the tractor in order to attach the apparatus to the tractor;

a power source connected to the motor for providing power to the motor, wherein the power source is a battery of the tractor; and a control mechanism connected to the motor, such that when the control mechanism is engaged, the control mechanism activates the motor which rotates the geared motor disc, causing the geared rotatable disc to rotate, which in turn causes the extended arm and the weight to rotate as well, wherein the control mechanism is manually engagable by a user of the tractor, whereby the control mechanism is used to rotate the weight such that the weight is optimally positioned to act as a counterweight for the tractor positioned on an inclined surface.

\* \* \* \* \*